United States Patent
Loc et al.

(10) Patent No.: US 8,971,306 B1
(45) Date of Patent: *Mar. 3, 2015

(54) MULTI-BAND COMMUNICATIONS FOR A SINGLE WIRELESS BASE STATION

(71) Applicant: Marvell International Ltd., Hamilton (BM)

(72) Inventors: Peter Loc, Cupertino, CA (US); Foo Keong Tang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 146 days.

This patent is subject to a terminal disclaimer.

(21) Appl. No.: 13/711,230

(22) Filed: Dec. 11, 2012

Related U.S. Application Data (60) Continuation of application No. 13/018,926, filed on Feb. 1, 2011, now Pat. No. 8,331,345, which is a continuation of application No. 12/482,573, filed on Jun. 11, 2009, now Pat. No. 7,881,254, which is a division of application No. 10/936,348, filed on Sep. 7, 2004, now Pat. No. 7,570,612.

(51) Int. Cl.
  *H04L 12/28* (2006.01)
  *H04W 72/04* (2009.01)

(52) U.S. Cl.
  CPC .................................. *H04W 72/04* (2013.01)
  USPC ........................................... 370/345; 370/431

(58) Field of Classification Search
  None
  See application file for complete search history.

(56) References Cited

U.S. PATENT DOCUMENTS

| | | | |
|---|---|---|---|
| 5,508,998 A | 4/1996 | Sha et al. | |
| 5,973,609 A | 10/1999 | Schoch | |
| 6,795,418 B2 | 9/2004 | Choi | |
| 6,907,238 B2 | 6/2005 | Leung | |
| 7,028,097 B2 | 4/2006 | Bard | |
| 7,099,671 B2 | 8/2006 | Liang | |
| 7,221,667 B2 * | 5/2007 | Hori et al. | 370/338 |
| 7,248,570 B2 | 7/2007 | Bahl et al. | |
| 7,327,258 B2 | 2/2008 | Fast et al. | |
| 7,492,753 B2 | 2/2009 | Smavatkul et al. | |
| 7,570,612 B1 * | 8/2009 | Loc et al. | 370/328 |
| 2003/0064752 A1 | 4/2003 | Adachi et al. | |

(Continued)

OTHER PUBLICATIONS

"Draft 802.20 Permanent Document: System Requirements for IEEE 802.20 Mobile Broadband Wireless Access Systems—Version 14," Jul. 16, 2004, pp. 1-23, IEEE 802.20-PD-06/V.14., IEEE, United States.

(Continued)

*Primary Examiner* — Kevin C Harper (57) ABSTRACT

A method of operating an access point includes storing, for each of a plurality of channels, a corresponding first value and second value. A first channel is selected according to a channel polling scheme. A first beacon is transmitted over the first channel to announce commencement of communication over the first channel. Subsequent to the first beacon but prior to a second beacon, data is exchanged with a wireless client over the first channel. The method includes, in response to a first time period based on the first value corresponding to the first channel expiring, transmitting the second beacon over the first channel to announce conclusion of communication over the first channel. The method includes, in response to a second time period based on the second value corresponding to the first channel expiring, transmitting a third beacon over the first channel to announce commencement of communication over the first channel.

20 Claims, 9 Drawing Sheets

(56) References Cited

U.S. PATENT DOCUMENTS

| | | |
|---|---|---|
| 2003/0188006 A1 | 10/2003 | Bard |
| 2004/0184475 A1 | 9/2004 | Meier |
| 2004/0196812 A1 | 10/2004 | Barber |
| 2004/0203566 A1 | 10/2004 | Leung |
| 2005/0025092 A1 | 2/2005 | Morioka et al. |
| 2005/0030967 A1 | 2/2005 | Ohmi et al. |
| 2005/0147055 A1 | 7/2005 | Stephens |
| 2005/0190738 A1 | 9/2005 | Smavatkul et al. |
| 2005/0239474 A9 | 10/2005 | Liang |
| 2005/0249227 A1 | 11/2005 | Wang et al. |
| 2006/0062189 A1 | 3/2006 | Takeuchi |
| 2007/0002804 A1 | 1/2007 | Xiong et al. |

OTHER PUBLICATIONS

"802.16 IEEE Standard for Local and Metropolitan Area Networks; part 16: Air Interface for Fixed Broadband Wireless Access Systems," 802.16 IEEE Standard for Local and Metropolitan Area Networks, Oct. 1, 2004, pp. 1-xxxiv and pp. 1-857, IEEE Std 802.16-2004, IEEE, United States.

\* cited by examiner

MULTI-BAND COMMUNICATIONS FOR A SINGLE WIRELESS BASE STATION

CROSS-REFERENCE TO RELATED APPLICATIONS

The present disclosure is a continuation of U.S. patent application Ser. No. 13/018,926 (now U.S. Pat. No. 8,331,345), filed on Feb. 1, 2011, which is a continuation of U.S. patent application Ser. No. 12/482,573 (now U.S. Pat. No. 7,881,254), filed on Jun. 11, 2009, which is a divisional of U.S. patent application Ser. No. 10/936,348 (now U.S. Pat. No. 7,570,612), filed on Sep. 7, 2004. The entire disclosures of the applications referenced above are incorporated herein by reference.

BACKGROUND

The present invention relates generally to wireless communications networks. More particularly, the present invention relates to multi-band communications for a single wireless base station.

Wireless communications networks are enjoying rapidly increasing popularity, especially in the small office/home office environment, and even at home. However, multiple frequency bands are available for such networks, and band-specific equipment is required for each. For example, the IEEE standard 802.11 specifies a 2.4 GHz frequency band, while the IEEE standard 802.11a specifies a 5 GHz frequency band. Conventional network devices designed for one band are unable to communicate with network devices in another band.

SUMMARY

In general, in one aspect, this specification discloses a method including: receiving, over a first wireless channel, a first beacon specifying a time interval during which a first wireless client is to communicate with a wireless access point according to an infrastructure network model; in response to receiving the first beacon, causing the first wireless client to exchange packets of data with the wireless base station over the first wireless channel for the time interval specified in the first beacon, and in response to expiration of the time interval specified in the first beacon, (i) causing the first wireless client to exchange packets of data with a second wireless client over a second wireless channel according to an ad hoc network model, or (ii) causing the first wireless client to enter a sleep state.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide a wireless base station that is able to communicate with wireless network devices operating on a plurality of different frequency bands. For example, one embodiment provides a wireless access point that is compliant with both of IEEE standards 802.11a and 802.11, which specify different frequency bands, and so is able to communicate with wireless network devices operating on both frequency bands. In addition, embodiments of the wireless base station enable wireless end stations, such as wireless clients, to communicate with each other via the base station even though the end stations operate on different frequency bands. Preferably the wireless access points are otherwise compliant with one or more of IEEE standards 802.11, 802.11a, 802.11b, 802.11g, 802.11n, 802.16, and 802.20.

Embodiments of the present invention also provide end stations that can both communicate with each other according to an ad hoc model, such as the ad hoc wireless network model specified by IEEE standard 802.11, and communicate with and via a wireless base station according to an infrastructure model, such as the infrastructure wireless network model specified by IEEE standard 802.11. Preferably the intervals during which the end stations operate according to each of these two models is controlled by the wireless base station using signals such as beacons. Preferably the wireless clients are otherwise compliant with one or more of IEEE standards 802.11, 802.11a, 802.11b, 802.11g, 802.11n, 802.16, and 802.20.

Figure 1:
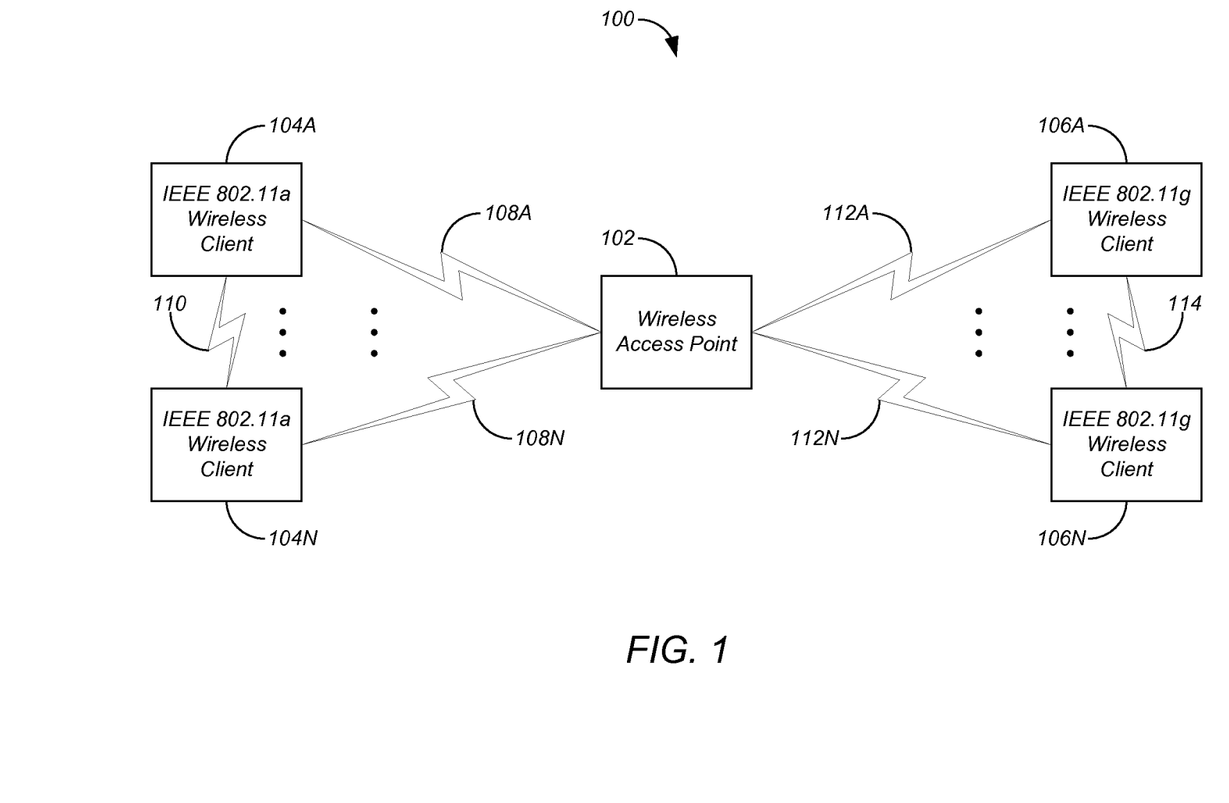
FIG. 1 shows a wireless network comprising a wireless access point, a plurality of wireless clients operating on one frequency band, and a further plurality of wireless clients operating on another frequency band.

FIG. 1 shows a wireless network 100 comprising a wireless access point 102, a plurality of wireless clients 104A through 104N operating on one frequency band such as a 2.4 GHz band such as that specified by IEEE standard 802.11, and a plurality of wireless clients 106A through 106N operating on another frequency band such as a 5 GHz band such as that specified by IEEE standard 802.11a. While embodiments of the present invention are described in terms of IEEE standard networks, wireless access points, and wireless clients, it will be understood by those skilled in the relevant arts after reading this description that the principles of the present invention extend to other sorts of wireless networks, wireless base stations, and wireless end stations.

Clients 104 and 106 are able to communicate in both ad hoc and infrastructure modes, as described in detail below. Thus the signals 108A through 108N exchanged between wireless access point 102 and wireless clients 104, as well as the signals 110 exchanged between clients 104, have carrier center frequencies in the 2.4 GHz band. Similarly, the signals 112A through 112N exchanged between wireless access point 102 and wireless clients 106, as well as the signals 114 exchanged between clients 106, have carrier center frequencies in the 5 GHz band.

Figure 2:
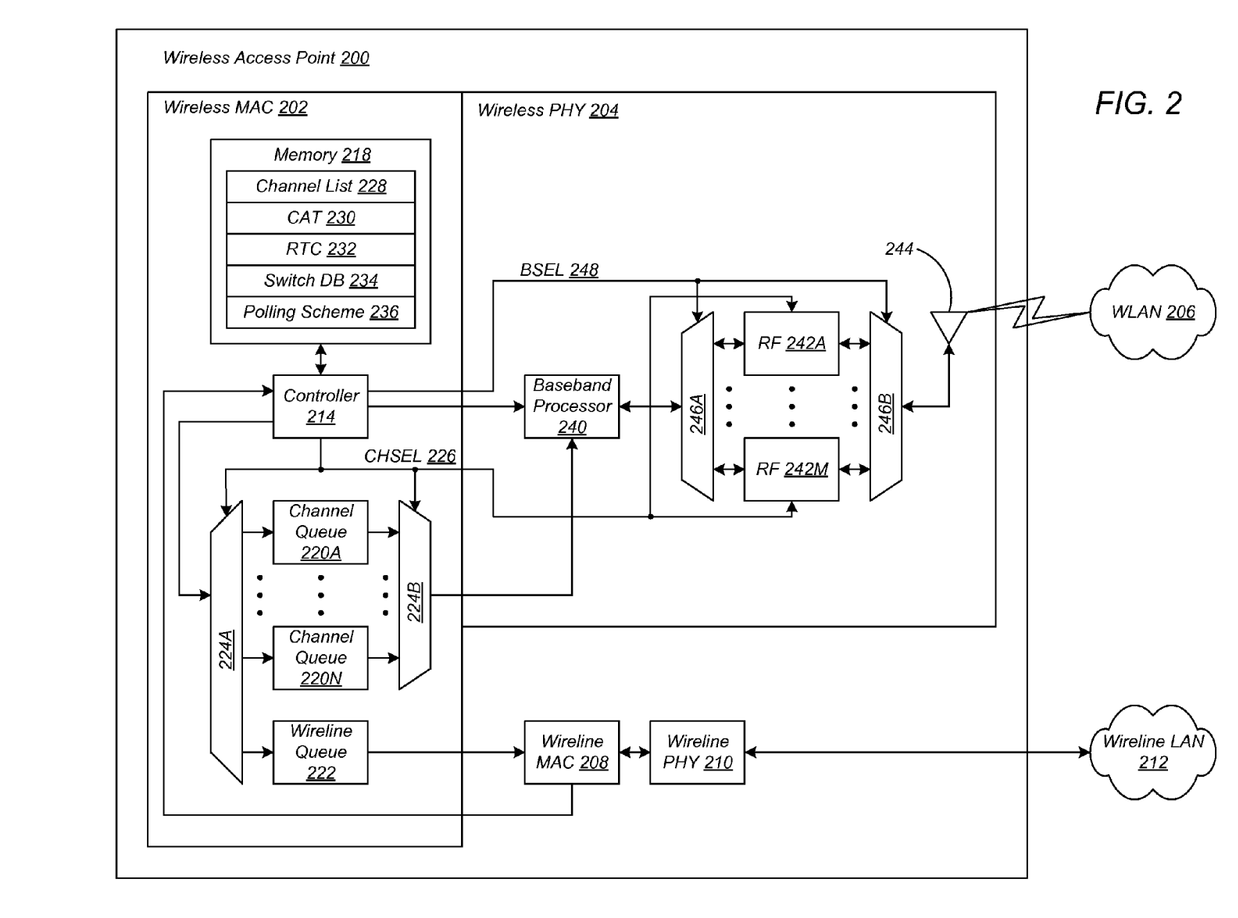
FIG. 2 shows a wireless access point according to a preferred embodiment of the present invention.

FIG. 2 shows a wireless access point 200 according to a preferred embodiment of the present invention. Other embodiments of the present invention provide wireless base stations with similar configurations. Wireless access point 200 comprises a wireless media access controller (MAC) 202, a wireless physical-layer device (PHY) 204 in communication with a wireless local-area network (WLAN) 206 or the like, a wireline MAC 208 such as an Ethernet MAC, and a wireline PHY 210 such as an Ethernet PHY in communication with a wireline network 212 such as an Ethernet wide-area network (WAN), LAN, or the like.

Wireless MAC 202 comprises a controller 214, a memory 218, a plurality of channel queues 220A through 220N, a wireline network queue 222, and switches 224A and 224B such as multiplexers and demultiplexers that operate according to a channel select signal (CHSEL) signal 226. Each channel queue 220 stores packets of data to be transmitted over a corresponding channel in WLAN 206. Wireline queue 222 stores packets of data to be transmitted to wireline network 212. Channel queues 220 and wireline network queue 222 can be implemented within memory 218.

Memory 218 stores a channel list 228 that lists all of the channels available in all of the frequency bands in which access point 200 operates. Memory 218 also stores a channel access time (CAT) value 230 and/or a return to channel (RTC) value 232 for each channel. The CAT and RTC values are used to control the intervals at which wireless clients 104 and 106 operate in ad hoc and infrastructure modes, as described in detail below. The CAT and RTC values can be fixed values, or can be modified during operation.

Memory 218 also stores a switch database 234 that learns the band and channel upon which each wireless client 104 and 106 is currently operating according to well-known methods. Memory 218 optionally stores a channel polling scheme 236, which in other embodiments can be implemented directly within controller 214.

Wireless PHY 204 comprises a baseband processor 240, a plurality of radio-frequency (RF) transceivers 242A through 242M, an antenna 244, and switches 246A and 246B such as multiplexers and demultiplexers that operate according to a band select signal (BSEL) signal 248.

Figure 3:
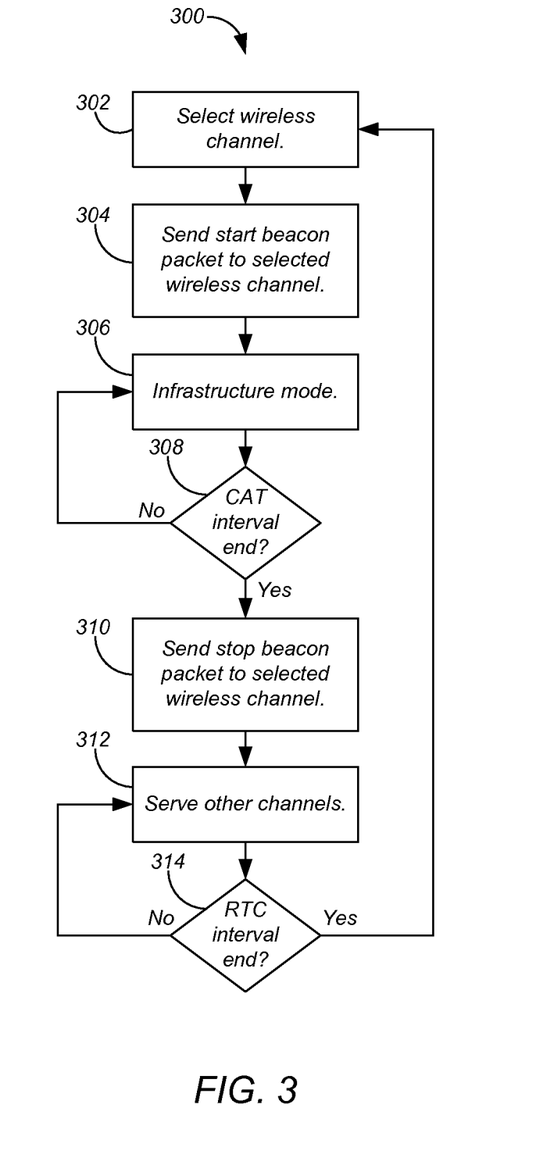
FIG. 3 shows a process for the wireless access point of FIG. 2 according to a preferred embodiment of the present invention.

FIG. 3 shows a process 300 for wireless access point 200 of FIG. 2 according to a preferred embodiment of the present invention. Other embodiments of the present invention provide similar processes for other types of wireless base stations.

Controller 214 selects one of the wireless channels identified in channel list 228 according to channel polling scheme 236 (step 302). Referring again to FIG. 2, controller 214 asserts channel select signal (CHSEL) 226 and band select signal (BSEL) 248 to identify the channel and the frequency band for the channel.

Any sort of channel polling scheme can be used. For example, in a round-robin polling scheme, the channels are polled according to their listing order in channel list 228. As another example, in a priority scheme the channels are prioritized, for example according to the type of traffic carried. Channels that carry low-latency traffic such as voice data could have high priorities, while channels for Internet access or file downloads could have lower priorities. In addition, the priorities could be weighted. Controller 214 then selects channels having high priorities more often than those with low priorities. As another example, a user-selected scheme could be used, in which the user selects the polling scheme, for example by entering some channels more than once in channel list 228 to achieve non-uniform spreading of traffic. As another example, an adaptive scheme could be used in which controller 214 determines when and how often to switch to each channel based on learned traffic patterns, the types of devices operating on the channels, and the like. For example, if controller 214 learns that no devices are operating on the IEEE 802.11g band, it can cease to poll the channels in that band, except for infrequent polling to detect new devices.

Controller 214 causes a start beacon packet to be sent to the selected wireless channel (step 304). In response to the CHSEL and BSEL signals, the RF transceiver 242 for the selected channel and band transmits the start beacon packet. The start beacon packet optionally comprises the channel access time (CAT) value for the selected wireless channel.

The start beacon packet indicates to the wireless clients that the wireless clients must now communicate with the wireless access point according to an infrastructure network model, such as the infrastructure wireless network model specified by IEEE standard 802.11.

Figure 4:
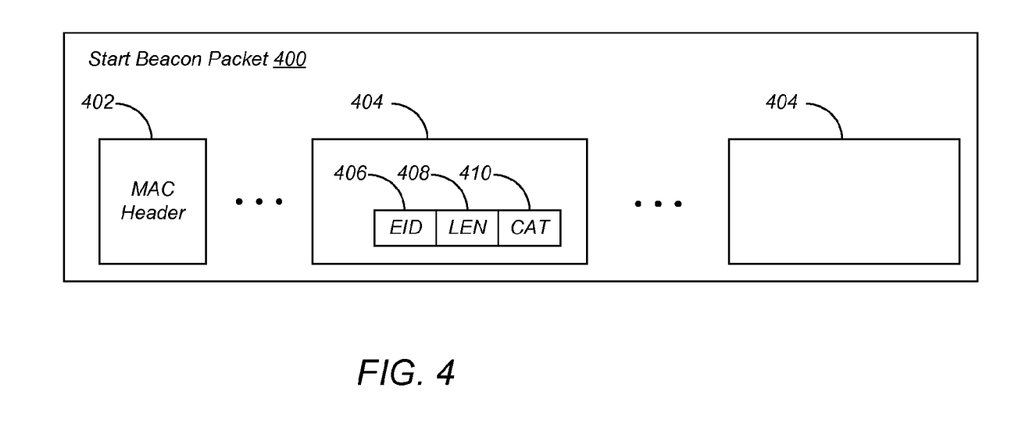
FIG. 4 shows the format of a start beacon packet according to a preferred embodiment.

FIG. 4 shows the format of a start beacon packet 400 according to a preferred embodiment. Start beacon packet 400 comprises a conventional MAC header 402 and a plurality of element fields 404. Each element field comprises an element identification parameter (EID) 406, a length parameter (LEN) 408, and one of a plurality of information parameters 410. The information parameters include a service set identity (SSID) parameter; a supported rates parameter; a distribution set (DS) parameter set; a traffic information map (TIM) parameter, as is well-known in the relevant arts. In addition to such conventional information parameters 410, start beacon packet 400 includes an information parameter 410 representing the CAT value for the channel. For example, the CAT value can be placed in an element field 404 reserved for a generic element or the like. Wireless clients monitor this field to determine the CAT value for the channel, as described in detail below.

Controller 214 then exchanges packets of data with the selected wireless channel according to the infrastructure network model for an interval specified by the CAT value for the selected wireless channel (step 306). Switch 224B selects the channel queue 220 for the selected wireless channel according to CHSEL signal 226. Baseband processor 240 receives packets from the channel queue 220. Switch 246A passes the packets to the proper RF transceiver 242 according to BSEL signal 248. The selected RF transceiver 242 transmits a signal representing the packets via switch 246B and antenna 244 to WLAN 206.

Packets received by MAC 202 from the selected wireless channel are fed by controller 214 to the proper destination channel queue 220 according to switch database 234. That is, controller 214 learns the channel on which each wireless client operates, and populates switch database 234 according to methods well-known in the relevant arts. When a packet is received, controller 214 consults switch database 234 to determine the channel on which the intended destination device operates, and places the packet in the channel queue 220 for that channel. If the packet is addressed to wireline network 212, controller 214 places the packet in wireline queue 222, where the packet is subsequently transmitted to wireline network 212 by wireline MAC 208 and wireline PHY 210. Packets received from wireline network 212 are placed into the proper channel queue 220 by a similar process.

At the end of the interval specified by the CAT value for the selected wireless channel (step 308), controller 214 causes a stop beacon packet to be sent to the selected wireless channel (step 310). In response to the CHSEL and BSEL signals, the RF transceiver 242 for the selected channel and band transmits the stop beacon packet. The stop beacon packet optionally comprises the return to channel (RTC) value for the selected wireless channel.

The stop beacon packet indicates to the wireless clients that the wireless clients are now free to communicate with each other according to an ad hoc network model, such as the ad hoc wireless network model specified by IEEE standard 802.11, to enter a low-power sleep state, or to perform some other function.

Figure 5:
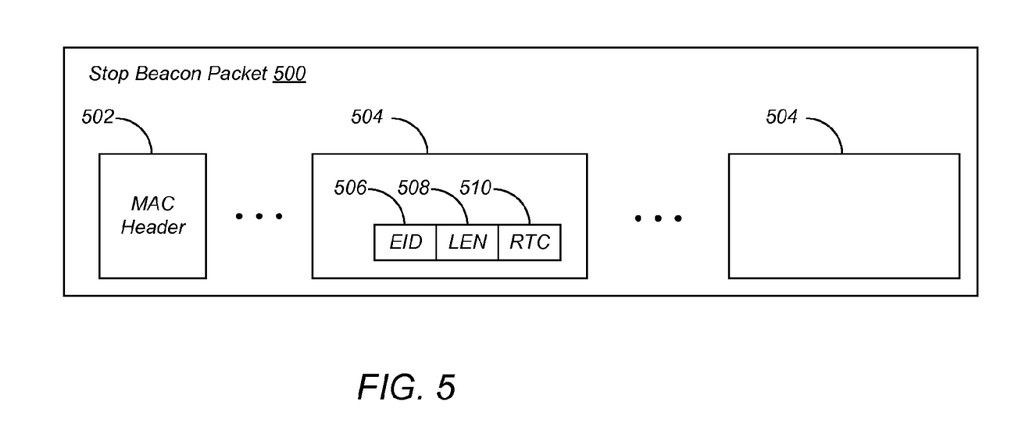
FIG. 5 shows the format of a stop beacon packet according to a preferred embodiment.

FIG. 5 shows the format of a stop beacon packet 500 according to a preferred embodiment. Like start beacon packet 400, stop beacon packet 500 comprises a conventional MAC header 502 and a plurality of element fields 504, each comprising an element identification parameter (EID) 506, a length parameter (LEN) 508, and one of a plurality of information parameters 510. In addition to conventional information parameters 510, stop beacon packet 500 includes an information parameter 510 representing the RTC value for the channel. For example, the RTC value can be placed in an element field 504 reserved for a generic element or the like. Wireless clients monitor this field to determine the RTC value for the channel, as described in detail below.

During this interval wireless access point 200 serves other channels in a similar manner (step 312). In particular, controller 214 selects another channel, which can be in a different frequency band, and repeats process 300 for that channel, in turn serving the channels in channel list 228 according to polling scheme 236. At the end of the interval specified by the RTC value (step 314), process 300 resumes with step 302 for the wireless channel.

Figure 6:
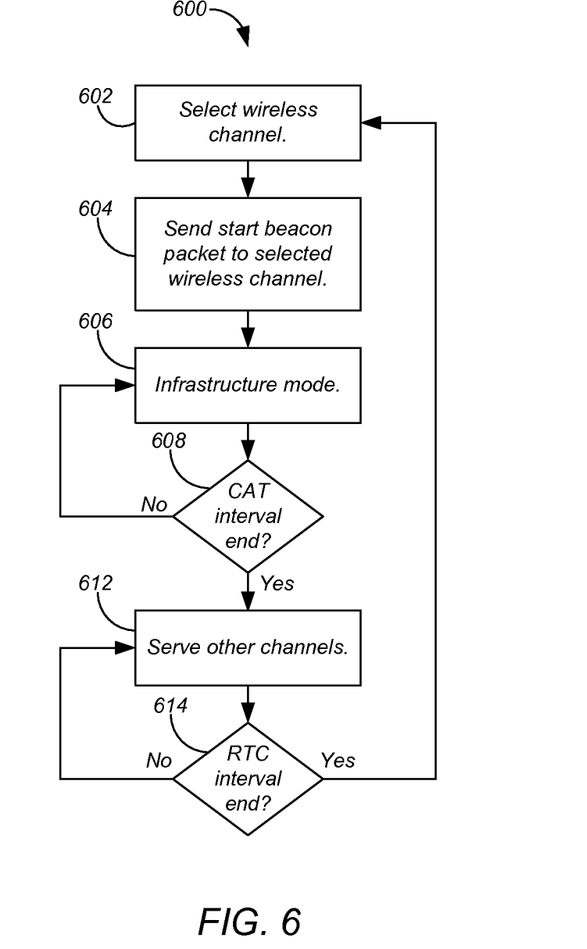
FIG. 6 shows a process for the wireless access point of FIG. 2 using a start beacon only according to a preferred embodiment of the present invention.

FIG. 6 shows a process 600 for wireless access point 200 of FIG. 2 using a start beacon only according to a preferred embodiment of the present invention. Other embodiments of the present invention provide similar processes for other types of wireless base stations.

Controller 214 selects one of the wireless channels identified in channel list 228 according to channel polling scheme 236 (step 602). Controller 214 causes a start beacon packet to be sent to the selected wireless channel (step 604). The start beacon packet comprises the channel access time (CAT) value for the selected wireless channel. The start beacon packet indicates to the wireless clients that the wireless clients must now communicate with the wireless access point according to an infrastructure network model, such as the infrastructure wireless network model specified by IEEE standard 802.11.

Controller 214 then exchanges packets of data with the selected wireless channel according to the infrastructure network model for an interval specified by the CAT value for the selected wireless channel (step 606), as described above. At the end of the interval specified by the CAT value for the selected wireless channel (step 608), process 600 resumes with step 602. In particular, controller 214 selects another channel, which can be in a different frequency band, and serves that channel in a similar manner, in turn serving the channels in channel list 228 according to polling scheme 236 (step 612). Meanwhile the wireless clients operating in the channel selected in step 602 are free to communicate with each other according to an ad hoc network model, such as the ad hoc wireless network model specified by IEEE standard 802.11, until they receive another start beacon from access point 200. After an interval specified by the RTC value for a wireless channel (step 614), controller 214 returns to the channel (step 602).

Figure 7:
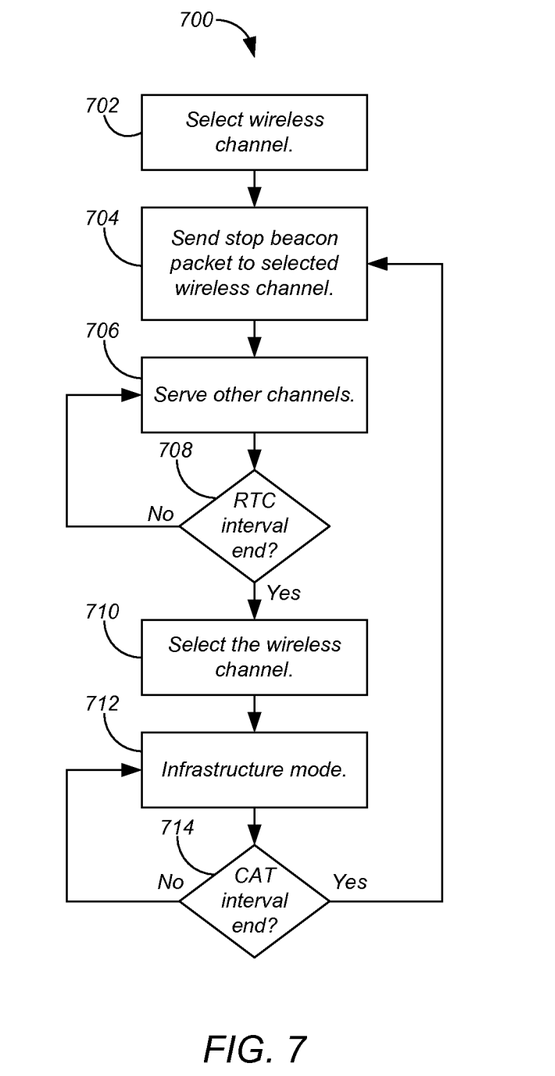
FIG. 7 shows a process for the wireless access point of FIG. 2 using a stop beacon only according to a preferred embodiment of the present invention.

FIG. 7 shows a process 700 for wireless access point 200 of FIG. 2 using a stop beacon only according to a preferred embodiment of the present invention. Other embodiments of the present invention provide similar processes for other types of wireless base stations.

Controller 214 selects one of the wireless channels identified in channel list 228 according to channel polling scheme 236 (step 702). Controller 214 causes a stop beacon packet to be sent to the selected wireless channel (step 704). The stop beacon packet comprises the return to channel (RTC) value for the selected wireless channel.

The stop beacon packet indicates to the wireless clients operating in the selected channel that the wireless clients are now free to communicate with each other according to an ad hoc network model, such as the ad hoc wireless network model specified by IEEE standard 802.11, to enter a low-power sleep state, or to perform some other function.

During the interval specified by the RTC value, access point 200 serves other channels in channel list 228 according to channel polling scheme 236 (step 706). At the end of the interval specified by the RTC value (step 708), access point 200 selects the channel selected in step 702 (step 710).

Controller 214 then exchanges packets of data with the selected wireless channel according to an infrastructure network model, such as the infrastructure wireless network model specified by IEEE standard 802.11, for an interval specified by the CAT value for the selected wireless channel (step 712). At the end of the interval specified by the CAT value (step 714), access point 200 returns to step 704 to transmit another stop beacon, and repeats process 700.

Figure 8:
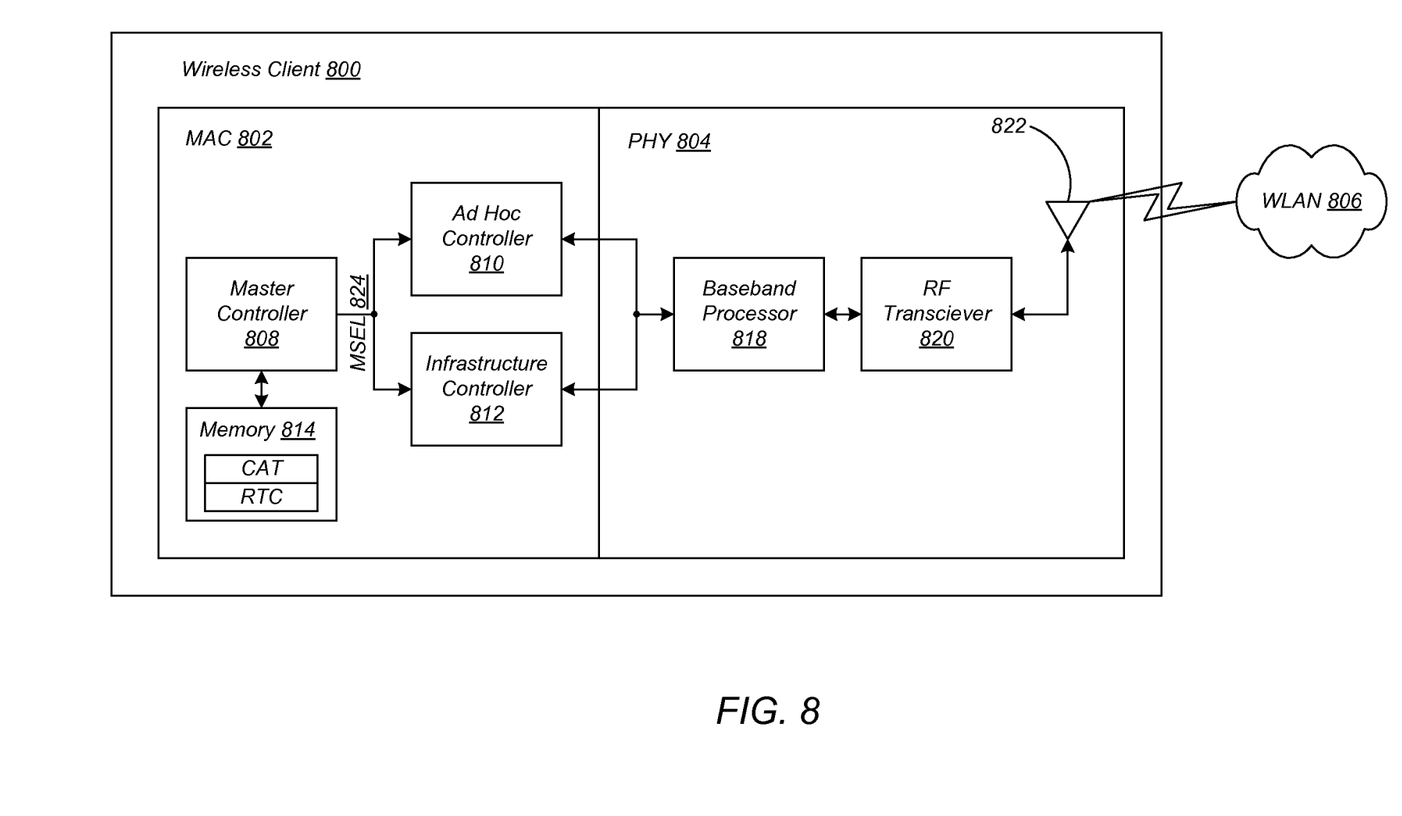
FIG. 8 shows a wireless client according to a preferred embodiment of the present invention.

FIG. 8 shows a wireless client 800 according to a preferred embodiment of the present invention. Other embodiments of the present invention provide wireless end stations with similar configurations. Wireless client 800 comprises a MAC 802 and a PHY 804 in communication with a WLAN 806. MAC 802 comprises a master controller 808, an ad hoc controller 810, an infrastructure controller 812, and a memory 814. PHY 804 comprises a baseband processor 818, an RF transceiver 820, and an antenna 822.

Figure 9:
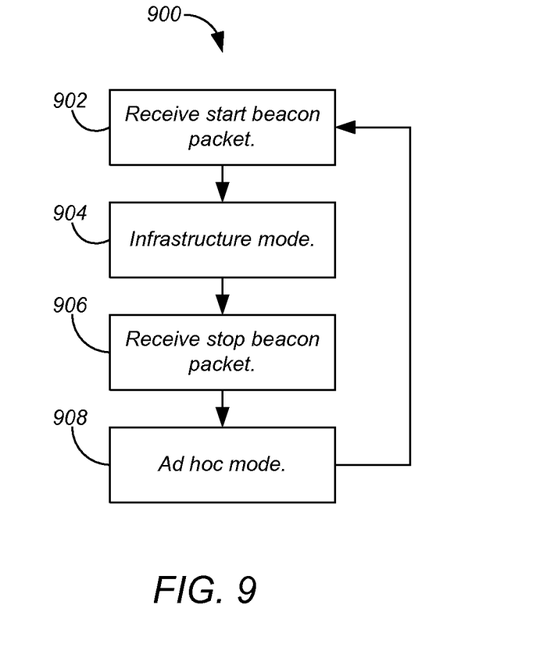
FIG. 9 shows a process for the wireless client of FIG. 8 according to a preferred embodiment of the present invention.

FIG. 9 shows a process 900 for wireless client 800 of FIG. 8 according to a preferred embodiment of the present invention. Other embodiments of the present invention provide similar processes for other types of wireless end stations.

Wireless client 800 receives a start beacon packet from a wireless access point (step 902). The start beacon optionally comprises a CAT value, as described above. Wireless client 800 stores the CAT value in memory 814. The start beacon packet indicates to wireless client 800 that wireless client 800 now must communicate with the wireless access point according to an infrastructure network model, such as the infrastructure wireless network model specified by IEEE standard 802.11.

In response to the start beacon packet, master controller 808 selects infrastructure controller 812 by asserting an infrastructure state of mode select (MSEL) signal 824. In response, infrastructure controller 812 exchanges packets of data with the wireless access point according to an infrastructure network model (step 904).

Wireless client 800 later receives a stop beacon packet from the wireless access point (step 906). The stop beacon optionally comprises a RTC value, as described above. Wireless client 800 stores the RTC value in memory 814. The stop beacon packet indicates to wireless client 800 that wireless client 800 is now free to communicate with other wireless clients in its channel according to an ad hoc network model, such as the ad hoc wireless network model specified by IEEE standard 802.11, to enter a low-power sleep state, or to perform some other function.

In embodiments where the start beacon packet comprises the CAT value, wireless client 800 can rely on the CAT value rather than upon receipt of a subsequent stop beacon packet. That is, infrastructure controller 812 exchanges packets of data with the wireless access point for an interval beginning with receipt of the start beacon packet and having a duration represented by the CAT value. This provides redundancy in case wireless client 800 does not properly receive the stop beacon packet. In other embodiments, wireless client 800 can rely upon either receipt of the stop beacon packet or expiration of the CAT interval, whichever occurs first (or last).

In response to the stop beacon packet (or expiration of the CAT interval), master controller 808 selects ad hoc controller 810 by asserting an ad hoc state of mode select (MSEL) signal 824. In response, ad hoc controller 810 exchanges packets of data with other wireless clients according to an ad hoc network model (step 908). Alternatively, master controller 808 can cause wireless client 800 to enter a low-power sleep state, or to perform some other function.

Wireless client 800 later receives another start beacon packet from the wireless access point (step 902), which optionally comprises a CAT value, as described above. In embodiments where the stop beacon packet comprises the RTC value, wireless client 800 can rely on the RTC value rather than upon receipt of a subsequent start beacon packet. That is, ad hoc controller 810 exchanges packets of data with other wireless clients in its channel for an interval beginning with receipt of the stop beacon packet and having a duration represented by the RTC value. This provides redundancy in case wireless client 800 does not properly receive the start beacon packet. In other embodiments, wireless client 800 can rely upon either receipt of the start beacon packet or expiration of the RTC interval, whichever occurs first (or last). Process 900 then repeats as described above.

Figure 10:
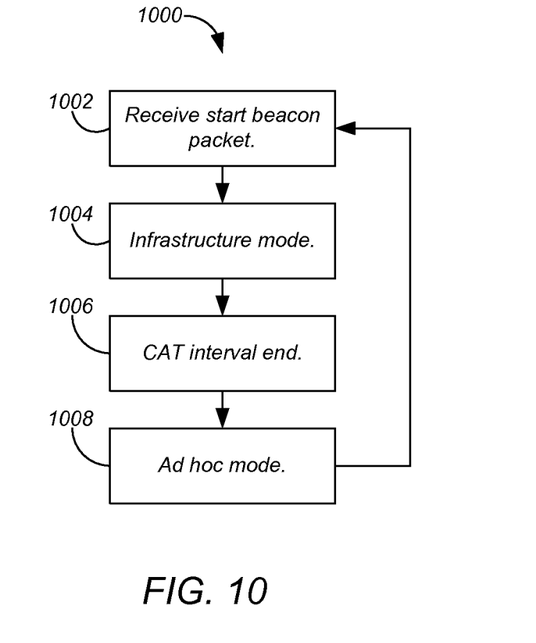
FIG. 10 shows a process for the wireless client of FIG. 8 using a start beacon only according to a preferred embodiment of the present invention.

FIG. 10 shows a process 1000 for wireless client 800 of FIG. 8 using a start beacon only according to a preferred embodiment of the present invention. Other embodiments of the present invention provide similar processes for other types of wireless end stations.

Wireless client 800 receives a start beacon packet from a wireless access point (step 1002). The start beacon comprises a CAT value, as described above. Wireless client 800 stores the CAT value in memory 814. The start beacon packet indicates to wireless client 800 that wireless client 800 now must communicate with the wireless access point according to an infrastructure network model, such as the infrastructure wireless network model specified by IEEE standard 802.11.

In response to the start beacon packet, master controller 808 selects infrastructure controller 812 by asserting an infrastructure state of mode select (MSEL) signal 824. In response, infrastructure controller 812 exchanges packets of data with the wireless access point according to an infrastructure network model (step 1004).

At the end of an interval beginning with receipt of the start beacon packet and having a duration specified by the CAT value (step 1006), master controller 808 selects ad hoc controller 810 by asserting an ad hoc state of mode select (MSEL) signal 824. In response, ad hoc controller 810 exchanges packets of data with other wireless clients according to an ad hoc network model (step 1008).

Wireless client 800 later receives another start beacon packet from the wireless access point (step 1002), which comprises a CAT value, as described above. Process 1000 then repeats as described above.

Figure 11:
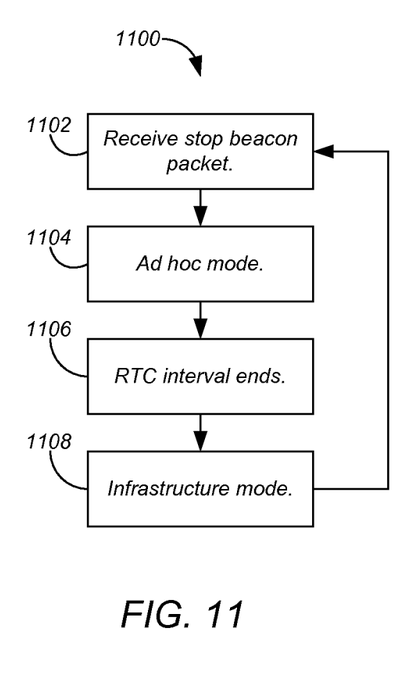
FIG. 11 shows a process for the wireless client of FIG. 8 using a stop beacon only according to a preferred embodiment of the present invention.

FIG. 11 shows a process 1100 for wireless client 800 of FIG. 8 using a stop beacon only according to a preferred embodiment of the present invention. Other embodiments of the present invention provide similar processes for other types of wireless end stations.

Wireless client 800 receives a stop beacon packet from the wireless access point (step 1102). The stop beacon comprises a RTC value, as described above. Wireless client 800 stores the RTC value in memory 814. The stop beacon packet indicates to wireless client 800 that wireless client 800 is now free to communicate with other wireless clients in its channel according to an ad hoc network model, such as the ad hoc wireless network model specified by IEEE standard 802.11, to enter a low-power sleep state, or to perform some other function.

In response to the stop beacon packet, master controller 808 selects ad hoc controller 810 by asserting an ad hoc state of mode select (MSEL) signal 824. In response, ad hoc controller 810 exchanges packets of data with other wireless clients according to an ad hoc network model (step 1104). Alternatively, master controller 808 can cause wireless client 800 to enter a low-power sleep state, or to perform some other function.

At the end of an interval beginning with receipt of the stop beacon packet and having a duration specified by the RTC value (step 1106), master controller 808 selects infrastructure controller 812 by asserting an infrastructure state of mode select (MSEL) signal 824. In response, infrastructure controller 812 exchanges packets of data with the wireless access point according to an infrastructure network model (step 1108).

Wireless client 800 later receives another stop beacon packet from the wireless access point (step 1102), which comprises a RTC value, as described above. Process 1100 then repeats as described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless access point comprising:
   a memory configured to store, for each channel of a plurality of wireless channels,
   (i) a corresponding first value indicative of a length of an interval the wireless access point spends communicating using the channel, and
   (ii) a corresponding second value indicative of a time between intervals of the wireless access point communicating using the channel; and
   a controller configured to
      according to a channel polling scheme, select a first channel of the plurality of wireless channels,
      transmit a first beacon frame over the first channel, wherein the first beacon frame announces commencement of infrastructure mode communication over the first channel,
      subsequent to transmission of the first beacon frame but prior to transmission of a second beacon frame, selectively exchange data frames with a wireless client over the first channel,
      in response to a first time period expiring, transmit the second beacon frame over the first channel, wherein the second beacon frame announces conclusion of infrastructure mode communication over the first channel, wherein the first time period begins subsequent to transmission of the first beacon frame, and wherein the first time period has a length based on the first value corresponding to the first channel, and
      in response to a second time period expiring, transmit a third beacon frame over the first channel, wherein the third beacon frame announces commencement of infrastructure mode communication over the first channel, wherein the second time period begins subsequent to transmission of the second beacon frame, and wherein the second time period has a length based on the second value corresponding to the first channel.

2. The wireless access point of claim 1, wherein the first channel corresponds to a frequency of approximately 2.4 GHz or a frequency of approximately 5 GHz, and a second channel of the plurality of wireless channels corresponds to the other of the frequency of approximately 2.4 GHz or the frequency of approximately 5 GHz.

3. The wireless access point of claim 1, further comprising a plurality of channel queues, wherein each channel queue is configured to store frames of data to be transmitted over a respective one of the plurality of wireless channels.

4. The wireless access point of claim 1, wherein wireless clients are permitted to communicate using ad hoc mode subsequent to transmission of the second beacon frame but prior to transmission of the third beacon frame.

5. The wireless access point of claim 1, wherein the first beacon frame includes a representation of the first value corresponding to the first channel.

6. The wireless access point of claim 1, wherein the second beacon frame includes a representation of the second value corresponding to the first channel.

7. The wireless access point of claim 1, wherein the channel polling scheme is based on priority of traffic carried on each of the plurality of wireless channels.

8. The wireless access point of claim 1, wherein the channel polling scheme is a round-robin polling scheme.

9. The wireless access point of claim 1, wherein the controller is configured to construct the channel polling scheme in response to user input.

10. The wireless access point of claim 1, wherein the controller is configured to learn traffic patterns and adaptively determine the channel polling scheme in response to the learned traffic patterns.

11. A method of operating a wireless access point, the method comprising:
    storing, for each channel of a plurality of wireless channels, a corresponding first value indicative of a length of an interval the wireless access point spends communicating using the channel;
    storing, for each channel of the plurality of wireless channels, a corresponding second value indicative of a time between intervals of the wireless access point communicating using the channel;
    according to a channel polling scheme, selecting a first channel of the plurality of wireless channels;
    transmitting a first beacon frame over the first channel, wherein the first beacon frame announces commencement of infrastructure mode communication over the first channel;
    subsequent to transmission of the first beacon frame but prior to transmission of a second beacon frame, selectively exchanging data frames with a wireless client over the first channel;
    in response to a first time period expiring, transmitting the second beacon frame over the first channel, wherein
       the second beacon frame announces conclusion of infrastructure mode communication over the first channel,
       the first time period begins subsequent to transmission of the first beacon frame, and
       the first time period has a length based on the first value corresponding to the first channel; and
    in response to a second time period expiring, transmitting a third beacon frame over the first channel, wherein
       the third beacon frame announces commencement of infrastructure mode communication over the first channel,
       the second time period begins subsequent to transmission of the second beacon frame, and
       the second time period has a length based on the second value corresponding to the first channel.

12. The method of claim 11, wherein the first channel corresponds to a frequency of approximately 2.4 GHz or a frequency of approximately 5 GHz, and a second channel of the plurality of wireless channels corresponds to the other of the frequency of approximately 2.4 GHz or the frequency of approximately 5 GHz.

13. The method of claim 11, further comprising storing frames of data in a plurality of channel queues, wherein each of the plurality of channel queues corresponds to a respective one of the plurality of wireless channels and the stored frames of data are to be transmitted over the respective one of the plurality of wireless channels.

14. The method of claim 11, wherein wireless clients are permitted to communicate using ad hoc mode subsequent to transmission of the second beacon frame but prior to transmission of the third beacon frame.

15. The method of claim 11, wherein the first beacon frame includes a representation of the first value corresponding to the first channel.

16. The method of claim 11, wherein the second beacon frame includes a representation of the second value corresponding to the first channel.

17. The method of claim 11, further comprising determining the channel polling scheme based on priority of traffic carried on each of the plurality of wireless channels.

18. The method of claim 11, wherein the channel polling scheme is a round-robin polling scheme.

19. The method of claim 11, further comprising constructing the channel polling scheme in response to user input.

20. The method of claim 11, further comprising learning traffic patterns and adaptively determining the channel polling scheme in response to the learned traffic patterns.

\* \* \* \* \*